June 23, 1953 V. J. WINKEL 2,642,835
GLUE APPLYING APPARATUS FOR LUMBER GLUING MACHINE
Original Filed Sept. 6, 1947 2 Sheets-Sheet 1

INVENTOR
VICTOR J. WINKEL
BY
*Buckhorn and Cheatham*
ATTORNEY

June 23, 1953     V. J. WINKEL     2,642,835
GLUE APPLYING APPARATUS FOR LUMBER GLUING MACHINE
Original Filed Sept. 6, 1947     2 Sheets-Sheet 2

INVENTOR
VICTOR J. WINKEL
BY
*Buckhorn and Cheatham*
ATTORNEY

Patented June 23, 1953

2,642,835

UNITED STATES PATENT OFFICE 2,642,835

GLUE APPLYING APPARATUS FOR LUMBER GLUING MACHINE

Victor J. Winkel, Portland, Oreg., assignor to Laminated Lumber Products, Inc., Portland, Oreg., a corporation of Oregon Original application November 11, 1952, Serial No. 772,565, now Patent No. 2,617,456, dated November 11, 1952. Divided and this application April 25, 1952, Serial No. 285,009

4 Claims. (Cl. 118—205)

The present application is a division of the application of Victor J. Winkel, Serial No. 772,565, filed September 6, 1947, and which has matured to Patent No. 2,617,456, issued November 11, 1952.

My present invention comprises a machine for gluing lumber scraps together to form large boards, thus providing means to utilize waste material in lumber mills or factories utilizing lumber. It is well known that in many industries scraps of lumber of good quality, except that they are of irregular dimensions, are sold for their salvage value or burned. The principal object of the present invention therefore is to reduce lumber wastage by utilizing mill scrap.

One object of the present invention is to provide large boards capable of being utilized as wall, ceiling or floor panels, or as the sides of boxes or the like, and in many other applications where larger boards than normally available are desirable or useful. I thus am able to provide a product having great value from material normally wasted.

An object of the present invention is to provide means for forming a continuous sheet of board material which may be cut into any desired lengths, by joining small board sections of irregular lengths together.

A further object of the present invention is to provide a new and improved edge gluing mechanism for applying glue to the edges of a plurality of adjacent board sections which are to be joined edge to edge.

A further object of the present invention is to provide a board fabricating machine in which boards are glued edge to edge, and in which the setting of the glue is achieved in rapid order.

A further object of the present invention is to provide a machine for making boards of smaller board sections, which may be quickly and easily adjusted in order to form boards of various widths.

The foregoing and other objects and advantages of the present invention will be more readily apparent from an inspection of the accompanying drawings taken in connection with the following specification wherein like numerals refer to like parts throughout.

In the drawings Fig. 1 is a plan view of a portion of the present invention disclosing the assembling table and the edge gluing mechanism;

Figure 1:
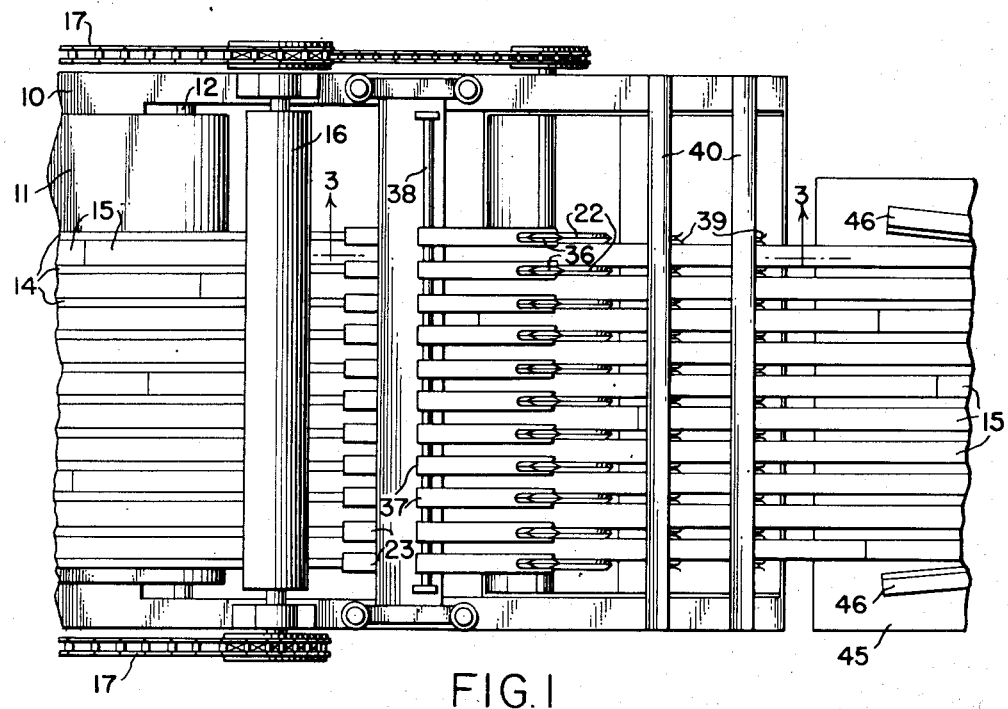
Figure 2:
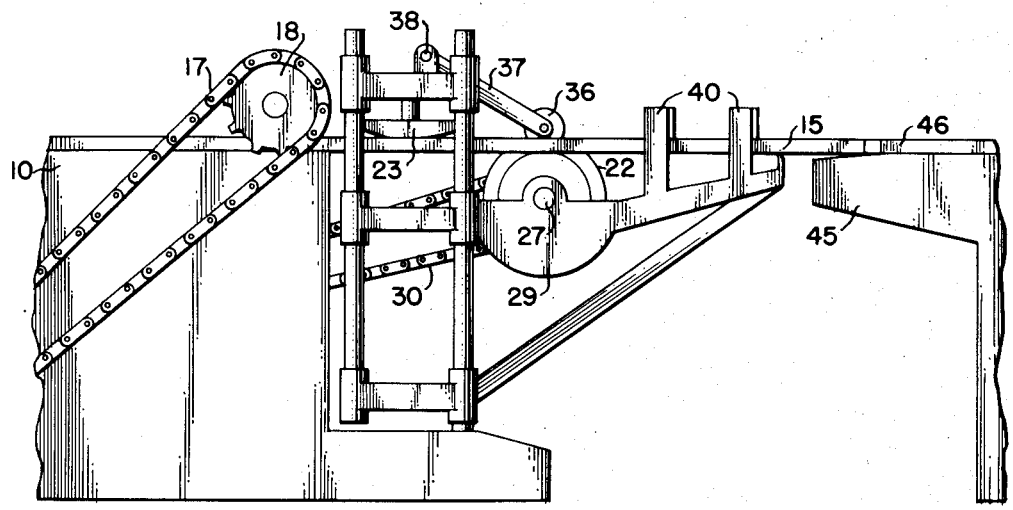
Fig. 2 is a side elevation of the mechanism disclosed in Fig. 1.
Figure 3:
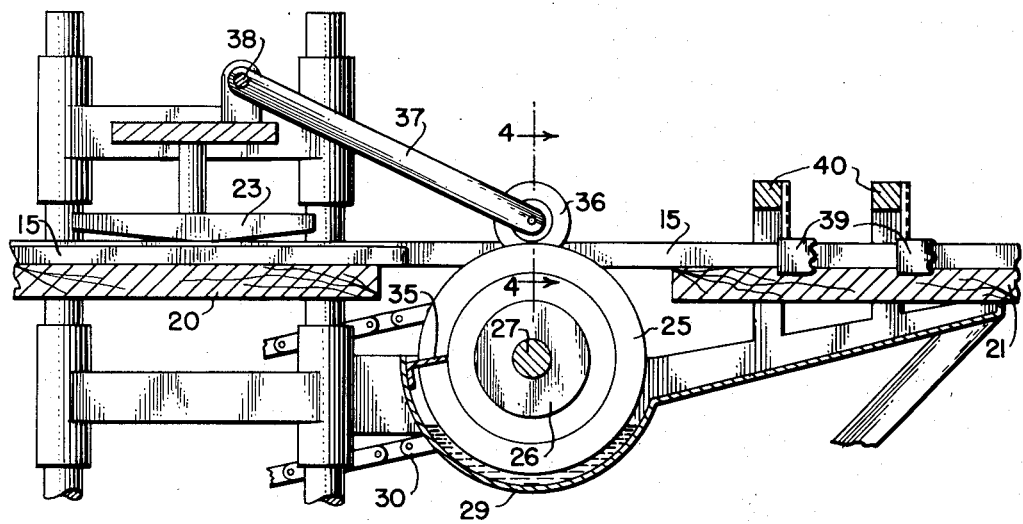
Fig. 3 is an enlarged detail view of the gluing mechanism taken substantially along line 3—3 of Fig. 1.
Figure 4:
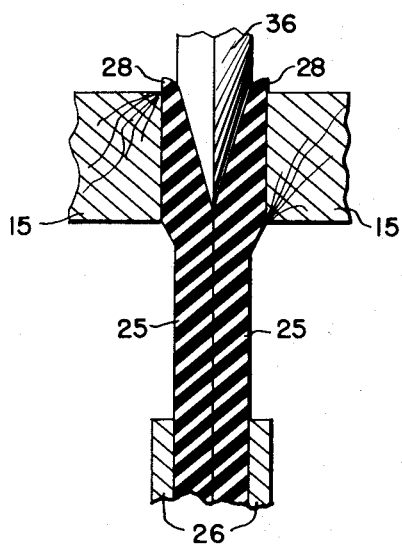
Fig. 4 is an enlarged section taken along line 4—4 of Fig. 3.

The machine comprises an assembly section 10 upon which is positioned a wide endless belt 11 extending over an end roller mounted upon a shaft 12. The belt 11 is driven by suitable motive means (not disclosed) so as to have a lineal speed in the range of 2 to 10 feet per minute. Positioned above the belt 11 are a plurality of parallel guide bars 14 which extend over the top of the table to provide troughs between which may be dropped sections of boards 15 of suitable standard width and depth but of any irregular length. Adjacent the end of the belt 11 and above the boards is positioned a driving roll 16 having a rubber or canvas covering thereon which is driven by suitable means such as the sprocket chains 17 and gears 18, the chain extending to suitable motive means such as the motor for driving the belt 11 (not shown). The boards are shoved forwardly from the end of belt 11 by the roller 16, across the top of intermediate supporting plates 20 and 21 between which are mounted a plurality of glue applying members 22, being held down against any upward thrusting tendency of the glue applying members by a plurality of pressure shoes 23.

The glue applying members each comprise a pair of flexible discs 25 retained between collars 26 mounted upon a shaft 27 extending transversely of the machine. The outer surfaces of the discs 25 adjacent their peripheries are beveled to provide flat surfaces 28. The surfaces 28 are immersed in adhesive contained within a trough 29 extending transversely of the machine. Any suitable adhesive may be positioned in the trough but I prefer a type of adhesive which is thermo-setting. The shaft 27 is driven by suitable means such as the sprocket chain 30 connected to the feeding drive.

As the discs 25 rotate the surfaces 28 pick up adhesive which is evenly spread by suitable spreaders 35 mounted on the edge of the trough 29 beneath the plate 20. The flat surfaces of the discs are so positioned as to extend upward between the adjacent edges of the board sections 15. A spreader disc 36 having a wedge-shaped cross section is mounted upon an arm 37 extending from a cross bar 38 and is so positioned between the discs 25 as to spread the beveled edges thereof outwardly at their uppermost extremities so as to bring the adhesive bearing surfaces thereof into contact with the adjacent edges of the board sections 15 to thereby coat the sections with adhesive. Shortly beyond the adhesive applying members there are preferably positioned a plurality of scraper members 39 mounted upon crossrods 40 so as to lie between the board sections 15. The scraper members (Fig. 1) preferably comprise U-shaped springs with notched ends spread outwardly in order firmly to contact the surfaces of the boards and spread the adhesive over the surfaces thereof. After leaving the adhesive appliers the board sections are received on an intermediate table 45 provided with edge guiding members 46 which converge toward each other to an extent such that the boards are brought together to form a single board of the width of the plurality of boards.

After the completed board leaves the adhesive applying machine it may be passed through any suitable adhesive setting machine such as shown in the parent patent, then through suitable transverse cutting mechanism, such as a flying shear or a flying rotary saw (not herein illustrated), so as to be cut into the desired lengths.

It is to be appreciated that modifications in detail and arrangement of the invention may occur to those skilled in the art. All such modifications in detail, and modifications in arrangement of the machine, as come within the true spirit and scope of the appended claims are considered to be a part of my invention.

I claim:

1. In a machine for making larger boards from smaller boards, an assembly table including a moving, supporting belt and a plurality of parallel guides positioned thereover to provide channels in which the smaller boards may be placed end-to-end in rows separated by the guides, and a plurality of adhesive applying means forwardly of said table adjacent the ends of said guides, each of said means comprising a pair of flexible discs whose edges extend between adjacent rows of smaller boards and a wedge-shaped spreader extending between the flexible discs to spread the edges of said flexible discs into contact with the adjacent faces of adjacent rows of smaller boards.

2. In a machine for making larger boards from smaller boards, an assembly table including feeding means and a plurality of parallel guides positioned to provide channels in which the smaller boards may be placed substantially end-to-end in rows separated by the guides, and a plurality of adhesive applying means forwardly of said table adjacent the ends of said guides, each of said applying means comprising a pair of flexible discs so mounted as to extend between adjacent rows of smaller boards and a wedge-shaped spreader disc extending between the flexible discs to spread the edges of said flexible discs into contact with the adjacent faces of adjacent rows of smaller boards.

3. In a machine for making larger boards from smaller boards, an assembly table including guides positioned to provide channels in which the smaller boards may be placed substantially end-to-end in rows separated by the guides, and adhesive applying means forwardly of the said table adjacent the ends of said guide comprising a plurality of pairs of flexible discs so mounted as to extend between adjacent rows of smaller boards and a plurality of wedge-shaped spreader discs, each extending between the edges of a pair of flexible discs to spread the edges of said flexible discs into contact with the adjacent faces of adjacent rows of smaller boards.

4. Adhesive applying means for applying adhesive to the adjacent longitudinal surfaces of a plurality of rows of boards for the purpose of joining said rows of boards to form a larger board, comprising a plurality of pairs of flexible discs, and wedge-shaped spreader discs extending between each pair of flexible discs to spread them into contact with the boards.

VICTOR J. WINKEL.

No references cited.